United States Patent
Kim

(10) Patent No.: US 9,160,191 B2
(45) Date of Patent: Oct. 13, 2015

(54) BATTERY PACK AND METHOD FOR MINIMIZING CELL VOLTAGE DEVIATIONS

(71) Applicant: Samsung SDI Co., Ltd, Yongin-si, Gyonggi-do (KR)

(72) Inventor: Jaesoon Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 192 days.

(21) Appl. No.: 13/927,029

(22) Filed: Jun. 25, 2013

(65) Prior Publication Data

US 2014/0210419 A1    Jul. 31, 2014

(30) Foreign Application Priority Data

Jan. 28, 2013 (KR) .................. 10-2013-0009362

(51) Int. Cl.
    *H02J 7/00* (2006.01)
(52) U.S. Cl.
    CPC .................... *H02J 7/0063* (2013.01)
(58) Field of Classification Search
    CPC ............ B60L 11/1866; B60L 11/1864; B60L 11/1855
    USPC ........................................................ 320/134
    See application file for complete search history.

(56) References Cited

U.S. PATENT DOCUMENTS

| | | | | |
|---|---|---|---|---|
| 8,648,570 B2* | 2/2014 | Lim et al. | | 320/118 |
| 8,810,201 B2* | 8/2014 | Yun et al. | | 320/118 |
| 8,872,482 B2* | 10/2014 | Jung | | 320/138 |
| 2010/0134070 A1* | 6/2010 | Yun et al. | | 320/118 |
| 2010/0277123 A1* | 11/2010 | Lim et al. | | 320/116 |
| 2011/0316520 A1* | 12/2011 | Kawahara et al. | | 323/351 |
| 2012/0032638 A1* | 2/2012 | Jung | | 320/112 |
| 2012/0091965 A1* | 4/2012 | Seo et al. | | 320/128 |
| 2013/0187605 A1* | 7/2013 | Potts | | 320/112 |
| 2014/0002003 A1* | 1/2014 | Kim | | 320/103 |
| 2014/0042977 A1* | 2/2014 | Kim | | 320/134 |
| 2014/0125284 A1* | 5/2014 | Qahouq | | 320/118 |
| 2014/0145678 A1* | 5/2014 | Hwang | | 320/118 |
| 2014/0210419 A1* | 7/2014 | Kim | | 320/134 |
| 2014/0252847 A1* | 9/2014 | Yang et al. | | 307/9.1 |
| 2014/0330463 A1* | 11/2014 | Jeong | | 701/22 |

FOREIGN PATENT DOCUMENTS

| | | |
|---|---|---|
| KR | 10-0680901 B1 | 2/2007 |
| KR | 10-2008-0083771 A | 9/2008 |
| KR | 10-1170489 B1 | 7/2012 |

* cited by examiner

*Primary Examiner* — Suchin Parihar
(74) *Attorney, Agent, or Firm* — Knobbe, Martens, Olson & Bear LLP

(57) ABSTRACT

In one aspect, a battery pack and a method of minimizing voltage deviations between battery cells within the battery pack is disclosed. The battery pack comprises a plurality of battery racks where each of the battery racks in turn comprises a plurality of battery cells. The battery pack also comprises a bidirectional inverter and a plurality of switch sets, where each of the switch sets are connected to one of the battery racks and is configured to electrically connect the bidirectional inverter and the battery racks. The battery pack additionally comprises a plurality of battery rack management systems, where each of the battery rack management systems is electrically connected to one of the battery racks and is configured to minimize voltage deviations between the battery cells. The battery rack management systems are also connected to a main battery management system configured to minimize voltage deviations between the battery racks.

17 Claims, 2 Drawing Sheets

BATTERY PACK AND METHOD FOR MINIMIZING CELL VOLTAGE DEVIATIONS

CROSS-REFERENCE TO RELATED APPLICATIONS

This application claims priority to and the benefit of Korean Patent Application No. 10-2013-0009362, filed on Jan. 28, 2013, the entire content of which is incorporated herein by reference.

BACKGROUND

1. Field

The disclosed technology relates to a battery pack and a method for minimizing voltage deviations between battery cells of the battery pack.

2. Description of the Related Technology

In general, motor vehicles that derive their power from electromotive force such as electric vehicles, hybrid electric vehicles, and electric scooters require large-capacity batteries capable of outputting high power and correspondingly high voltage and current ranges. The required voltage may be in the range of tens of volts to hundreds of volts and the required current may be in the range of tens of milliamps to hundreds of amps to be able to supply power in the range of several tens of watts to several kilowatts. To meet these requirements, battery packs including a plurality of battery racks are often employed. A battery rack in turn includes a plurality of battery cells that are connected to each other in series and/or parallel to output a desired amount of power.

In order to improve safety, improve the lifetime of the battery pack, and obtain a high voltage output throughout the lifetime of the battery pack, it is desirable to maintain a uniform voltage across the battery cells included in each of the battery racks. To this end, many battery packs have battery management systems for performing cell balancing to minimize voltage deviations between the battery cells.

However, battery management systems are generally designed to monitor voltage deviations between the battery cells and perform voltage balancing at the cell-to-cell level do not address voltage deviations that exist between battery racks nor perform voltage balancing at the rack-to-rack level. Thus, there is a need for a battery pack having a battery rack management system which addresses the cell-to-cell voltage deviations within a battery rack, as well as rack-to-rack voltage deviations within a battery pack.

SUMMARY OF CERTAIN INVENTIVE ASPECTS

In one aspect, a battery pack according to one embodiment comprises a plurality of battery racks where each of the battery racks comprises a plurality of battery cells. The battery pack also comprises a bidirectional inverter having a first terminal and a second terminal, the first terminal configured to be electrically connected to positive terminals of the battery racks and the second terminal configured to be electrically connected to negative terminals of the battery racks. The battery pack additionally comprises a plurality of switch sets, each of the switch sets connected to one of the battery racks and configured to electrically connect the bidirectional inverter and the one of the battery racks. The battery pack additionally comprises a plurality of battery rack management systems, where each of the battery rack management systems is electrically connected to one of the battery racks and is configured to minimize voltage deviations between the battery cells included in the one of the battery racks. The battery pack additionally comprises a main battery management system connected to each of the battery rack management systems and configured to minimize voltage deviations between the battery racks.

According to another embodiment, the main battery management system of the battery pack is configured to minimize voltage deviations between the battery racks when each of the switch sets are turned on to connect the first terminal to positive terminals of the battery racks and to connect the second terminal to negative terminals of the battery racks.

According to another embodiment, each of the battery rack management systems of the battery pack is configured to minimize voltage deviations between the battery cells included in the one of the battery racks connected to the battery rack management system.

According to another embodiment, the main battery management system of the battery pack is configured to minimize voltage deviations between the battery racks and the battery rack management systems are configured to minimize voltage deviations between the battery cells when the bidirectional inverter is turned off.

According to another embodiment, each of the switch sets of the battery pack is configured to be turned on or off under the control of the battery rack management system connected to the switch set.

According to another embodiment, each of the switch sets of the battery pack includes a first switch configured to electrically connect the positive terminal of the connected battery rack and the first terminal of the bidirectional inverter, and a second switch configured to electrically connect the negative terminal of the connected battery rack and the second terminal of the bidirectional inverter.

According to another embodiment, each of the switch sets of the battery pack further includes a first fuse electrically connected between the first switch and the positive terminal of the battery rack connected to the switch set, and a second fuse electrically connected between the second switch and the negative terminal of the battery rack connected to the switch set.

According to another embodiment, each of the switch sets of the battery pack further includes a current sensor connected between the first switch and the first fuse.

According to another embodiment, each of the switch sets of the battery pack includes a voltage sensor connected between positive and negative terminals of the battery rack connected to the switch set.

According to another embodiment, the battery racks of the battery pack are connected to each other in parallel.

According to another embodiment, the battery cells in the battery racks of the battery pack are connected to each other in series.

According to another embodiment, the bidirectional inverter of the battery pack is electrically connected to the main battery management system and is configured to be turned on or off under the control of the main battery management system.

In another aspect, a method of minimizing voltage deviations between battery cells within a battery pack according to one embodiment comprises providing a plurality of battery racks where each of the battery racks comprises a plurality of battery cells. The method also comprises providing a bidirectional inverter having a first terminal and a second terminal, where first and second terminals configured to electrically connect to positive and negative terminals of the battery racks. The method additionally comprises electrically connecting a plurality of switch sets to the battery racks, where each of the switch sets is connected to one of the battery racks and is configured to electrically connect the bidirectional inverter and the one of the battery racks. The method additionally comprises providing a plurality of battery rack management systems, where each of the battery rack management systems are electrically connected to one of the battery racks and configured to minimize voltage deviations between the battery cells included in the one of the battery racks. The method additionally comprises providing a main battery management system connected to each of the battery rack management systems and configured to minimize voltage deviations between the battery racks.

According to another embodiment, the method of minimizing voltage deviations between battery cells within a battery pack further includes turning on each of the switch sets, minimizing voltage deviations between the battery racks, and minimizing voltage deviations between the battery cells included in each of the battery racks.

According to another embodiment, the method of minimizing voltage deviations between battery cells within a battery pack further comprises turning off the bidirectional inverter under the control of the main battery management system before turning on each of the switch sets.

According to another embodiment, minimizing voltage deviations between the battery racks includes selectively discharging at least one battery rack having a battery rack voltage value higher than an average battery rack voltage value.

According to another embodiment, minimizing voltage deviations between the battery cells includes selectively discharging at least one battery cell having a cell voltage values higher than an average battery cell voltage value.

BRIEF DESCRIPTION OF THE DRAWINGS

The objects, features and advantages of the present invention will be more apparent from the following detailed description in conjunction with the accompanying drawings, in which.

DETAILED DESCRIPTION OF CERTAIN INVENTIVE EMBODIMENTS

Figure 1:
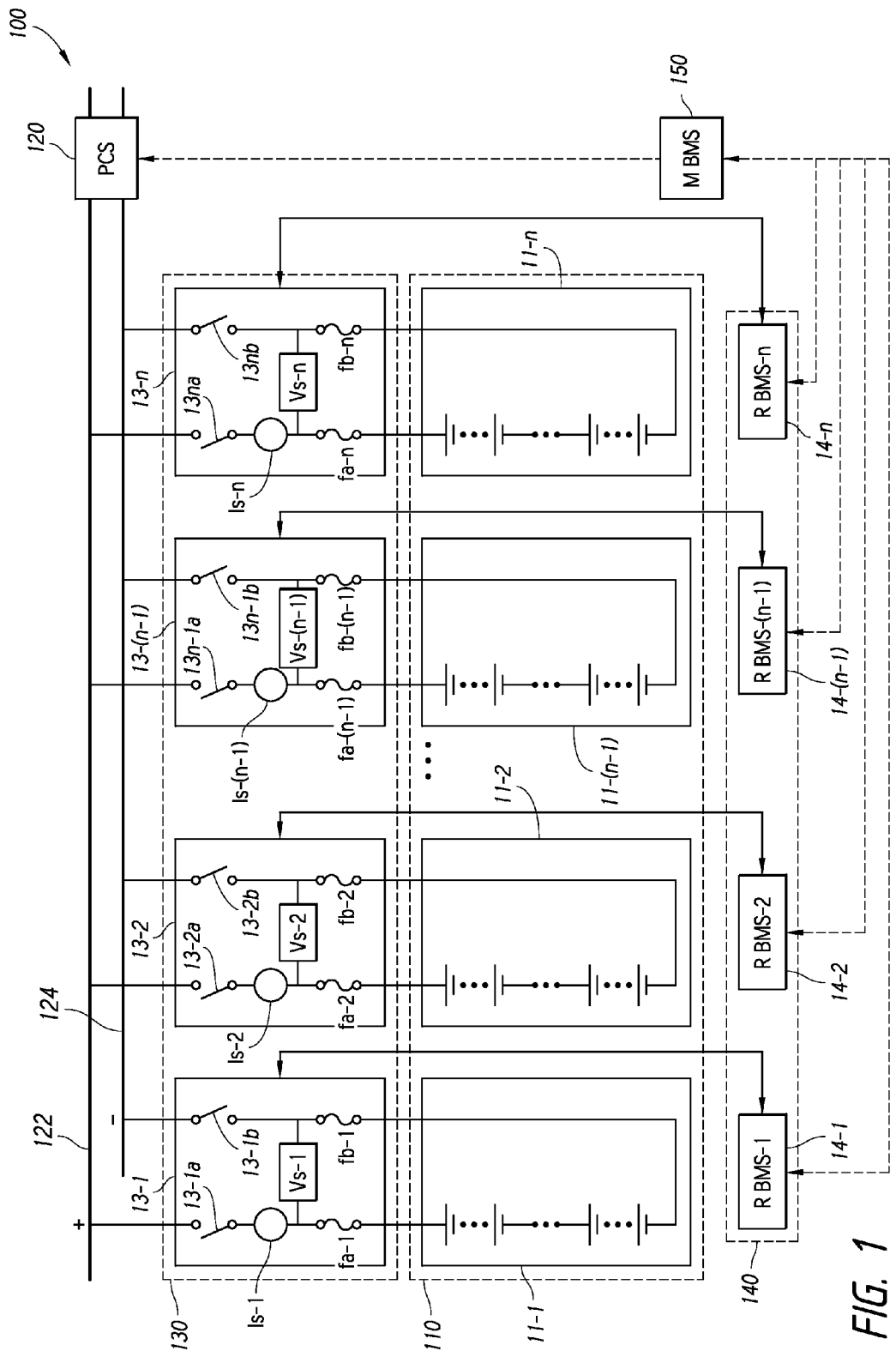
FIG. 1 is a schematic circuit diagram of a battery pack according to an embodiment of the present invention.

Hereinafter, some exemplary embodiments are described in detail with reference to the accompanying drawings. As those skilled in the art would realize, the described embodiments may be modified in various ways, without departing from the spirit or scope of the present invention.

Reference is made to embodiments, examples of which are illustrated in the accompanying drawings. In the drawings, similar elements are generally denoted by the same reference numerals. When it is described that an element is "electrically coupled" to another element, the element may be "directly coupled" to the other element through a third element.

Referring to FIG. 1, a schematic circuit diagram of a battery pack according to an embodiment of the present invention is illustrated.

A battery pack 100 according to the illustrated embodiment in FIG. 1 comprises a plurality of battery racks 110 where each of the battery racks comprises a plurality of battery cells C. The battery pack 100 also comprises a bidirectional inverter (i.e., a power conversion system (PCS)) 120 having a first terminal 122 and a second terminal 124. The first terminal 122 is configured to be electrically connected to positive terminals of the battery racks 110 and the second terminal 124 is configured to be electrically connected to negative terminals of the battery racks 110. The battery pack additionally comprises a plurality of switch sets 130, each of the switch sets connected to one of the battery racks and configured to electrically connect the bidirectional inverter 120 and the one of the battery racks. The battery pack 100 additionally comprises a plurality of battery rack management systems 140, where each of the battery rack management systems 140 is electrically connected to one of the battery racks and is configured to minimize voltage deviations between the battery cells C included in the one of the battery racks. The battery pack 100 additionally comprises a main battery management system (M BMS) 150 connected to each of the battery rack management systems (R BMS's) 140 and configured to minimize voltage deviations between the battery racks 110.

Each of the plurality of battery racks 110 includes a plurality of battery cells C. In some embodiments, each of the battery racks 110 includes battery cells C connected to each other in series. In other embodiments, each of the battery racks 110 includes battery cells C connected to each other in parallel.

In some embodiments, the battery cells C within a battery rack have substantially the same capacity. In addition, the battery racks 110 in some embodiments include the same number of battery cells C. When the battery racks 110 include battery cells C connected to each other in series, each of the battery racks 110 includes the same number of battery cells C having substantially the same capacity connected to each other in series. On the other hand, when each of the battery racks 110 includes battery cells C connected to each other in parallel, each of the battery racks 110 includes the same number of battery cells C having substantially the same capacity connected to each other in parallel.

In some embodiments, each of the battery racks 110 is electrically connected to one of the switch sets 130. The battery racks 110 are electrically connected to each other in parallel through the plurality of switch sets 130. That is to say, when switches included in the plurality of switch sets 130 are all switched on, the plurality of battery racks 110 are connected to each other in parallel.

In addition, each of the battery racks 110 is electrically connected to one of the plurality of battery rack management systems 140. In the illustrated embodiment of FIG. 1, the battery racks, the switch sets, and the battery rack management systems that are connected to one another are denoted by corresponding numerals. For example, first through nth battery racks 11-1, 11-2, . . . , and 11-n are connected to first through nth battery rack management systems 14-1, 14-2, . . . , and 14-n, respectively, through first through nth switch sets 13-1, 13-2, . . . , and 13-n, respectively.

For example, the first battery pack 11-1 is electrically connected to the first switch set 13-1 and the first battery rack management system (R BMS1) 14-1. Similarly, the second battery pack 11-2 is electrically connected to the second switch set 13-2 and the second battery rack management system 14-2. Likewise, the nth battery pack 11-n is electrically connected to the nth switch set 13-n and the nth battery rack management system 14-n. Here, n is an integer constant, referring to the number of battery racks included in the battery pack 100.

In the illustrated embodiment of FIG. 1, the bidirectional inverter 120 is electrically connected to the plurality of battery racks 110 through the plurality of switch sets 130. In particular, the first terminal 122 of the bidirectional inverter 120 is configured to be electrically connected to positive terminals of the battery racks 110 and the second terminal 124 of the bidirectional inverter 120 is configured to be electrically connected to negative terminals of the battery racks 110. In addition, according to some embodiments, the bidirectional inverter 120 is configured to be turned on or off under the control of the main battery management system 150. When the bidirectional inverter 120 is turned on, it may convert externally input AC voltages into DC voltages or, alternatively, may convert DC voltages resulting after the battery pack 110 is discharged into AC voltages. For example, the bidirectional inverter 120 converts the AC voltages input to the bidirectional inverter 120 into DC voltages that are applied to the battery racks 110 during charging of the battery pack 100. Similarly, the bidirectional inverter 120 converts DC voltages output from the plurality of battery racks 110 into AC voltages that are supplied to devices incorporating the battery pack 100. When the bidirectional inverter 120 is turned off, it may interrupt inputting or outputting of voltages between the battery pack 100 and the device incorporating the battery pack 100.

In the illustrated embodiment of FIG. 1, each of the switch sets 130 is electrically connected to one of the battery racks 110. In addition, each of the switch sets 130 is electrically connected to the bidirectional inverter 120. In other words, the plurality of switch sets 130 are electrically connected between the plurality of battery racks 110 and the bidirectional inverter 120. In some embodiments, the number of the plurality of switch sets 130 may be equal to the number of the plurality of battery racks 110 (i.e., n in FIG. 1).

In one embodiment, switch sets 130 have essentially the same configuration as one another, and each is connected to one of the battery racks 110 and one of the bidirectional inverter 120 in the same manner as one another. Therefore, the following description will focus on the first switch set 13-1 among the plurality of switch sets 130, which is electrically connected to the first battery pack 11-1 and the bidirectional inverter 120.

In one embodiment, the first switch set 13-1 includes a first switch 13-1*a* and a second switch 13-1*b*. The first switch 13-1*a* is electrically connected between a positive electrode of the first battery pack 11-1 and the first terminal 122 of the bidirectional inverter 120. The second switch 13-1*b* is electrically connected between a negative electrode of the first battery pack 11-1 and the second terminal 124 of the bidirectional inverter 120. In some embodiments, the first switch set 13-1 is connected to the first battery rack management system 14-1 and operates under the control of the first battery rack management system 14-1. That is to say, the first switch 13-1*a* and the second switch 13-1*b* are configured to be turned on or off under the control of the first battery rack management system 14-1.

In addition, the first switch set 13-1 may further include first and second fuses fa-1 and fb-1, a voltage sensor Vs-1 and a current sensor Is-1. The first fuse fa-1 is connected between the positive electrode of the first battery pack 11-1 and the first switch 13-1*a* of the first switch set 13-1, and the second fuse fb-1 is connected between the negative electrode of the first battery pack 11-1 and the second switch 13-1*b* of the first switch set 13-1. The voltage sensor Vs-1 is provided between the positive and negative electrodes of the first battery pack 11-1 and is configured to measure the voltage difference between positive and negative terminals of the first battery pack 11-1. The current sensor Is-1 may be electrically connected to the positive electrode of the first battery pack 11-1 through the first fuse fa-1. That is to say, the current sensor Is-1 is electrically connected between the first fuse fa-1 and the first switch 13-1*a* and is configured to measure the current flowing through the first battery pack 11-1.

The first fuse fa-1 and the second fuse fb-1 are configured to be turned off under the control of the first battery rack management system 14-1. In addition, the voltage and current values of the first battery pack 11-1, measured by the voltage sensor Vs-1 and the current sensor Is-1, are communicatively transmitted to the first battery rack management system 14-1.

In the illustrated embodiment of FIG. 1, each of the battery rack management systems 140 is electrically connected to one of the plurality of battery racks 110. In addition, each of the battery rack management systems 140 (e.g., 14-1) connected to one of the battery racks (e.g., 11-1) is communicatively connected to the one of the switch sets 130 (e.g., 13-1) to control the switch set (e.g., 13-1). In addition, each of the battery rack management systems 140 are communicatively connected with the main battery management system 150. In some embodiments, the number of the plurality of battery rack management systems 140 may be equal to the number of the plurality of battery racks 110 (i.e., n in FIG. 1).

Each of the plurality of battery rack management systems 140 is configured to monitor voltages of the plurality of battery cells C included in one of the battery racks 110 connected to the battery rack management system 140, and minimize deviations of the voltages between the battery cells C to render the battery cells C to have substantially the same voltage.

For example, the first battery rack management system 14-1 selectively discharges battery cells C having relatively high voltages, thereby minimizing deviations in voltages between the battery cells C included in the first battery pack 11-1 to a value less than or equal to a predetermined value. In some implementations, the first battery rack management system 14-1 can essentially eliminate voltage deviations between the battery cells C.

In the illustrated embodiment of FIG. 1 the main battery management system 150 is electrically connected to the bidirectional inverter 120. For example, the main battery management system 150 communicatively controls the bidirectional inverter 120 to be turned on or off.

In one embodiment, the main battery management system 150 is communicatively connected with each of the plurality of battery rack management systems 140 and configured to perform Controller Area Network (CAN) communication with the plurality of battery rack management systems 140. In addition, the main battery management system 150 is configured to determine the voltages of the battery racks 110 communicatively transmitted from the plurality of battery rack management systems 140. The main battery management system 150 is further configured to balance the battery racks 110 to have substantially the same voltage. In other words, the main battery management system 150 is configured to monitor the voltages of the battery racks 110 and minimize voltage deviations between the battery racks 110 included in the battery pack 100 so that each of the battery racks 110 to has substantially the same voltage.

For example, the main battery management system 150 selectively discharges battery racks within battery racks 110 having relatively high voltages, thereby minimizing deviations voltages between the battery racks included in the battery pack 100 equal to or less than a predetermined value. In some implementations, the main battery management system 150 can essentially eliminate the voltage deviations between the battery racks 110.

As described above, the main battery management system 150 of the battery pack 100 is configured to balance voltages between each of the plurality of battery racks 110 by minimizing voltage deviations between the battery racks 110. In addition, the main battery management system 150 is communicatively connected to each of the battery rack management systems 140, which is in turn configured to balances voltages between each of the plurality of battery cells C by minimizing voltage deviations between the battery cells C included in each of the battery racks 110. Therefore, the battery pack 100 is configured to balances the voltages of individual battery cells C included in each of the battery racks 110 through the main battery management system 150, thereby minimizing voltage deviations between the battery cells C.

In the following, a method of minimizing voltage deviations between battery cells within the battery pack 100 of FIG. 1 according to one embodiment is disclosed. The method comprises providing a plurality of battery racks 110 where each of the battery racks comprises a plurality of battery cells C. The method also comprises electrically connecting a first terminal 122 of a bidirectional inverter 120 and a second terminal 124 of the bidirectional inverter 120 to positive and negative terminals of the battery racks 110. The method additionally comprises electrically connecting a plurality of switch sets 130 to the battery racks 110, where each of the switch sets 13-1, 13-2, and 13-n is connected to the battery racks 11-1, 11-2, and 11-n, respectively, and is configured to electrically connect the bidirectional inverter 120 and the one of the battery racks. The method additionally comprises electrically connecting battery rack management systems 14-1, 14-2, and 14-n to the battery racks 11-1, 11-2, and 11-n, respectively, where the battery management system is configured to minimize voltage deviations between the battery cells C included in the one of the battery racks. The method additionally comprises electrically connecting a main battery management system 150 to each of the battery rack management systems 14-1, 14-2, and 14-n, where the main battery management system 150 is configured to minimize voltage deviations between the battery racks 110.

Figure 2:
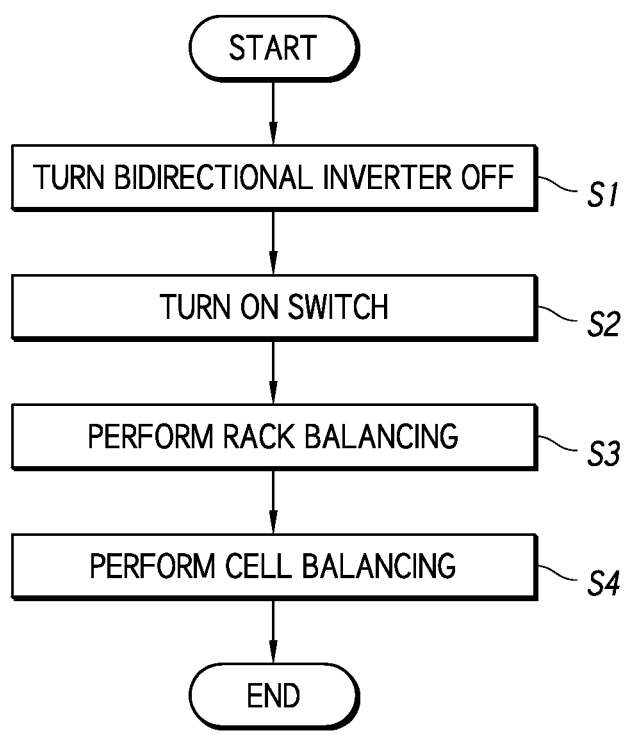
FIG. 2 is a flowchart of a cell balancing method using the battery pack shown in FIG. 1.

FIG. 2 is a flowchart illustrating a method of minimizing voltage deviations between battery cells within the battery pack according to another embodiment.

In the illustrated embodiment of FIG. 2, the method of minimizing voltage deviations between battery cells within the battery pack includes turning off (S1) a bidirectional inverter, turning on (S2) a switch, performing (S3) rack balancing and performing (S4) cell balancing. Hereinafter, the cell balancing method shown in FIG. 2 will be described with reference to the configuration of the battery pack shown in FIG. 1.

First, in turning off (S1) of the bidirectional inverter, the main battery management system 150 turns off the bidirectional inverter 120. When the bidirectional inverter is turned off, inputting or outputting of voltages between the battery pack 100 and a device incorporating the battery pack 100 are interrupted.

In turning on (S2) the switch, the plurality of battery rack management systems 140 control the plurality of switch sets 13-1, 13-2, . . . , and 13-n corresponding to the plurality of battery rack management systems 14-1, 14-2, . . . , and 14-n to turn on the plurality of switch sets 13-1, 13-2, . . . , and 13-n, respectively. In turning on (S2) the switch, the plurality of switch sets 130 are all turned on. Under some circumstances, when one or more of the plurality of switch sets 130 are turned off, disparities in the voltage levels between the battery racks 110 can develop, resulting in cell balancing errors. In these circumstances, in order to prevent the cell balancing error, the switches included in the plurality of switch sets 130 are all turned on in turning on (S2) the switch.

In performing (S3) rack balancing, the main battery management system 150 receives the voltage values corresponding to the battery racks 110 transmitted from the battery rack management systems 140, and balances the voltages of the battery racks 110 so that each of the battery racks has substantially the same voltage level. That is to say, performing (S3) rack balancing, in order to minimize voltage deviations between the battery racks 110, a voltage balancing of each of the battery racks 11-1, 11-2, . . . , and 11-n is performed. For example, the main battery management system 150 may perform rack balancing by selectively discharging battery racks having relatively high voltages so as to make the voltage deviation between each of the plurality of battery racks 110 equal to or smaller than a predetermined value. In one embodiment, minimizing voltage deviations between the battery racks is performed by selectively discharging at least one battery rack having a battery rack voltage value higher than an average battery rack voltage value.

In performing (S4) cell balancing, balancing is performed on the plurality of battery cells C included in each of the battery racks 11-1, 11-2, . . . , and 11-n corresponding to the plurality of battery rack management systems 14-1, 14-2, . . . , and 14-n. For example, the first battery rack management system 14-1 balances the plurality of battery cells C included in the first battery pack 11-1 to have substantially the same voltage level, the second battery rack management system 14-2 balances the plurality of battery cells C included in the second battery pack 11-2 to have substantially the same voltage level, and the nth battery rack management system 14-n balances the plurality of battery cells C included in the nth battery rack 11-n to have substantially the same voltage level. That is to say, in step S4, the plurality of battery rack management systems 14-1, 14-2, . . . , and 14-n balance the voltages of the plurality of battery cells C included in each of the plurality of battery racks 110. In one embodiment, minimizing voltage deviations between the battery cells is performed by selectively discharging at least one battery cell having a cell voltage values higher than an average battery cell voltage value.

That is to say, the cell balancing method of the battery pack is performed by performing rack balancing in step S3 to minimize or essentially eliminate voltage deviations between the battery racks and performing cell balancing in step S4 to minimize or essentially eliminate voltage deviations between the battery cells C within each battery rack. Therefore, according to the cell balancing method of the battery pack, the voltage deviation between each of all the battery cells included in the battery pack 100 can be minimized or essentially eliminated.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A battery pack comprising:
   a plurality of battery racks, each of the battery racks comprising a plurality of battery cells;
   a bidirectional inverter having a first terminal and a second terminal, the first terminal configured to be electrically connected to positive terminals of the battery racks and the second terminal configured to be electrically connected to negative terminals of the battery racks;
   a plurality of switch sets, each of the switch sets connected to one of the battery racks and configured to electrically connect the bidirectional inverter and the one battery rack;

a plurality of battery rack management systems, each of the battery rack management systems electrically connected to one of the battery racks and configured to reduce voltage deviations between the battery cells included in the one battery rack below a first predetermined level; and a main battery management system connected to each of the battery rack management systems and configured to reduce voltage deviations between the battery racks below a second predetermined level.

2. The battery pack of claim 1, wherein the main battery management system is configured to reduce voltage deviations between the battery racks when each of the switch sets are turned on to connect the first terminal to positive terminals of the battery racks and to connect the second terminal to negative terminals of the battery racks.

3. The battery pack of claim 2, wherein each of the battery rack management systems is configured to reduce voltage deviations between the battery cells included in the one battery rack connected to the battery rack management system.

4. The battery pack of claim 3, wherein the main battery management system is configured to reduce voltage deviations between the battery racks and the battery rack management systems are configured to reduce voltage deviations between the battery cells when the bidirectional inverter is turned off.

5. The battery pack of claim 3, wherein each of the switch sets are configured to be turned on or off under the control of the battery rack management system connected to the switch set.

6. A battery pack comprising:
a plurality of battery racks, each of the battery racks comprising a plurality of battery cells;
a bidirectional inverter having a first terminal and a second terminal, the first terminal configured to be electrically connected to positive terminals of the battery racks and the second terminal configured to be electrically connected to negative terminals of the battery racks;
a plurality of switch sets, each of the switch sets connected to one of the battery racks and configured to electrically connect the bidirectional inverter and the one battery rack, each of the switch sets including:
a first switch configured to electrically connect the positive terminal of the one battery rack connected to the switch set and the first terminal of the bidirectional inverter; and
a second switch configured to electrically connect the negative terminal of the one battery rack connected to the switch set and the second terminal of the bidirectional inverter;
a plurality of battery rack management systems, each of the battery rack management systems electrically connected to one of the battery racks and configured to reduce voltage deviations between the battery cells included in the one battery rack below a first predetermined level; and
a main battery management system connected to each of the battery rack management systems and configured to reduce voltage deviations between the battery racks below a second predetermined level.

7. The battery pack of claim 6, wherein each of the switch sets further includes a first fuse electrically connected between the first switch and the positive terminal of the battery rack connected to the switch set, and a second fuse electrically connected between the second switch and the negative terminal of the battery rack connected to the switch set.

8. The battery pack of claim 6, wherein each of the switch sets further includes a current sensor connected between the first switch and the first fuse.

9. The battery pack of claim 1, wherein each of the switch sets includes a voltage sensor connected between positive and negative terminals of the one battery rack connected to the switch set.

10. The battery pack of claim 1, wherein the battery racks are connected to each other in parallel.

11. The battery pack of claim 1, wherein the battery cells are connected to each other in series.

12. The battery pack of claim 1, wherein the bidirectional inverter is electrically connected to the main battery management system and is configured to be turned on or off under the control of the main battery management system.

13. A method of reducing voltage deviations between battery cells within a battery pack, the battery pack comprising a plurality of battery racks, each of the battery racks comprising a plurality of battery cells, the method comprising:
electrically connecting a first terminal of a bidirectional inverter to positive terminals of the battery racks and electrically connecting a second terminal of the bidirectional inverter to negative terminals of the battery racks;
electrically connecting a plurality of switch sets to the battery racks, each of the switch sets configured to electrically connect the bidirectional inverter and one of the battery racks;
electrically connecting each one of a plurality of battery rack management systems to one of the battery racks, each of the battery rack management systems configured to reduce voltage deviations between the battery cells included in the connected battery rack below a first predetermined value; and
electrically connecting a main battery management system to each of the battery rack management systems, the main battery management system configured to reduce voltage deviations between the battery racks below a second predetermined value.

14. The method of claim 13, further comprising
turning on each of the switch sets;
reducing voltage deviations between the battery racks below the first predetermined value; and
reducing voltage deviations between the battery cells included in each of the battery racks below the second predetermined value.

15. The method of claim 14, further comprising turning off the bidirectional inverter under the control of the main battery management system before turning on each of the switch sets.

16. The method of claim 14, wherein reducing voltage deviations between the battery racks includes selectively discharging at least one battery rack having a battery rack voltage value higher than an average battery rack voltage value.

17. The method of claim 14, wherein reducing voltage deviations between the battery cells includes selectively discharging at least one battery cell having a cell voltage values higher than an average battery cell voltage value.

* * * * *